(12) United States Patent
Simpson et al.

(10) Patent No.: US 8,326,473 B2
(45) Date of Patent: Dec. 4, 2012

(54) POWERED VEHICLE CONVOYING SYSTEMS AND METHODS OF CONVOYING POWERED VEHICLES

(75) Inventors: Rich Callaghan Simpson, Pittsburgh, PA (US); Vinod Kumar Sharma, Pittsburgh, PA (US); Joseph John Olson, Pittsburgh, PA (US); Jeremy Robert Puhlman, Gibsonia, PA (US); Edmund Frank LoPresti, Pittsburgh, PA (US); Leonard Casimir Mostowy, Jr., Avalon, PA (US)

(73) Assignee: University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 1156 days.

(21) Appl. No.: 12/168,266

(22) Filed: Jul. 7, 2008

(65) Prior Publication Data

US 2009/0012666 A1 Jan. 8, 2009

Related U.S. Application Data

(60) Provisional application No. 60/958,554, filed on Jul. 6, 2007.

(51) Int. Cl.
*A61G 5/00* (2006.01)

(52) U.S. Cl. ....... 701/22; 180/14.1; 180/14.2; 180/65.1; 280/250.1; 280/304.1

(58) Field of Classification Search .............. 701/22, 701/23; 180/6.5, 14.1, 14.2, 65.1, 65.51; 280/250.1, 304.1

See application file for complete search history.

(56) References Cited

U.S. PATENT DOCUMENTS

| | | | | |
|---|---|---|---|---|
| 4,027,738 | A * | 6/1977 | Lundin | 180/14.3 |
| 4,502,557 | A * | 3/1985 | Anderson | 180/14.2 |
| 4,518,053 | A * | 5/1985 | Queveau | 180/14.2 |
| 4,771,838 | A * | 9/1988 | Ketcham | 180/6.62 |
| 5,558,350 | A * | 9/1996 | Kimbrough et al. | 280/426 |
| 6,126,246 | A * | 10/2000 | Decker et al. | 303/7 |
| 6,419,037 | B1 * | 7/2002 | Kramer et al. | 180/14.2 |
| 6,973,981 | B2 * | 12/2005 | Stummer | 180/14.2 |
| 7,263,782 | B2 * | 9/2007 | Steinich | 33/732 |
| 7,331,436 | B1 * | 2/2008 | Pack et al. | 191/12.2 A |

(Continued)

FOREIGN PATENT DOCUMENTS

GB 2398047 A * 8/2004

(Continued)

OTHER PUBLICATIONS

Nisbet, Paul et al.; 'Smart' Wheelchairs for Mobility Training; Technology and Disability; 1996; 5; 49-62.

(Continued)

*Primary Examiner* — Thomas Black
*Assistant Examiner* — Peter D Nolan
(74) *Attorney, Agent, or Firm* — Bartony & Associates, LLC

(57) ABSTRACT

A vehicle convoy system for use in connection with a vehicle, wherein the vehicle includes at least one drive mechanism to impart drive to the vehicle, includes at least a first processor that is adapted to be placed in operative or communicative connection with the drive mechanism to effect control of the drive mechanism based upon data of the position of a leading vehicle in front of the vehicle so that the vehicle moves to follow movement of the leading vehicle. The vehicle can, for example, be a self-propelled wheelchair.

41 Claims, 9 Drawing Sheets

U.S. PATENT DOCUMENTS

| | | | |
|---|---|---|---|
| 7,593,811 B2 * | 9/2009 | Schmidt et al. | 701/205 |
| 7,706,969 B2 * | 4/2010 | Takagi et al. | 701/200 |
| 7,904,222 B2 * | 3/2011 | Lee et al. | 701/41 |
| 2007/0233337 A1 * | 10/2007 | Plishner | 701/23 |
| 2008/0041644 A1 * | 2/2008 | Tudek et al. | 180/65.1 |
| 2009/0192658 A1 * | 7/2009 | Wofford, Jr. | 701/2 |

FOREIGN PATENT DOCUMENTS

| | | |
|---|---|---|
| GB | 2411159 | 8/2005 |
| JP | 2006304925 | 11/2006 |
| WO | WO2006/137545 A1 | 12/2006 |
| WO | PCT/US2008/069293 | 7/2008 |

OTHER PUBLICATIONS

Argyros, Antonis et al.; Semi-autonomous Navigation of a Robotic Wheelchair; Journal of Intelligent and Robotic Systems; 2002; 34; 315-329.

Arora, Ankit et al.; Pocket PC Beacons: Wi-Fi Based Human Tracking and Following; AMC Symposium on Applied Computing; 2005; 970-974.

Cooper, Rory A. et al.; Evaluation of a Pushrim-Activated, Power-Assisted Wheelchair; Arch. Phys. Med. Rehabil.; 2001; vol. 82; 702-708.

Cooper, Rory A. et al.; Performance Assessment of a Pushrim-Activated Power-Assisted Wheelchair Control System; IEEE Transactions on Control Systems Technology; Jan. 2002; vol. 10; No. 1; 121-126.

Espinosa, Felipe et al.; Advanced and Intelligent Control Techniques Applied to the Drive Control and Path Tracking Systems on a Robotic Wheelchair; Autonomous Robots; 2001; 11; 137-148.

Jaffe, David L. et al.; Ultrasonic Head Controlled Wheelchair/Interface A Case Study in Development and Technology Transfer; 1990; RESNA 13th Annual Conference, Washington, D. C. pp. 23-24.

Kamiuchi, Shinji et al.; A Novel Human Interface of an Omni-Directional Wheelchair; IEEE International Workshop on Robot and Human Interactive Communication; 2004; Kurashiki, Okayama Japan; pp. 101-106.

Kuno, Yoshinori et al.; A Robotic Wheelchair Based on the Integration of Human and Environmental Observations: Look Where You're Going; IEEE Robotics & Automation Magazine; Mar. 2003; 26-34.

Luo, Ren C. et al.; Force Reflective Feedback Control for Intelligent Wheelchairs; IEEE/RSJ Internaitonal Conference on Intelligent Robots and Systems; 1999; 918-923.

Miller, David P. Moving in Tandem: Automated Person Pacing for Wheelchair Users, 1996, pp. 1-3.

Prassler, Erwin et al.; Tracking Multiple Moving Objects for Real-Time Robot Navigation; Autonomous Robots; 2000;8; 105-116.

Schilling, Klaus et al.; Sensors to Improve the Safety for Wheelchair Users; Web posted on Aug. 24, 1998; Disability Information Resourses: www.dinf.ne.jp.

Simpson, Richard C.; Smart Wheelchairs: A Literature Review; Journal of Rehabilitation Research & Development; Jul./Aug. 2005; vol. 42; No. 4; 423-436.

Borenstein, J.; Multi-Layered Control of a Four-Degree-of-Freedom Mobile Robot with Compliant Linkage; Proceeding of the International Conference of Robotics and Automation Atlanta; IEEE; 1993; vol. conf. 10; pp. 7-12.

Levine, S. P. et al.; The NacChair Assistive Wheelchair Navigation System; IEEE Transactions on Rehabilitation Engineering; 1999; vol. 7; No. 4; pp. 443-451.

* cited by examiner

POWERED VEHICLE CONVOYING SYSTEMS AND METHODS OF CONVOYING POWERED VEHICLES

CROSS-REFERENCE TO RELATED APPLICATION

The present invention claims benefit of U.S. Provisional Patent Application Ser. No. 60/958,554, filed Jul. 6, 2007, the disclosure of which is incorporated herein by reference.

BACKGROUND OF THE INVENTION

The present invention relates to powered vehicle convoying systems and to methods of convoying powered vehicle and particularly, to convoying system and methods in which a trailing vehicle (for example, a trailing wheelchair) includes at least one convoying system to enable a drive mechanism of the trailing vehicle to be controlled to follow motions of a leading vehicle (for example, a leading wheelchair).

The following information is provided to assist the reader to understand the invention disclosed below and the environment in which it will typically be used. The terms used herein are not intended to be limited to any particular narrow interpretation unless clearly stated otherwise in this document. References set forth herein may facilitate understanding of the present invention or the background of the present invention. The disclosure of all references cited herein are incorporated by reference.

In many situations, it is desirable to create a group or convoy of vehicles for transporting the vehicles as a unit by, for example, a single operator. For example, it is often desirable to create a convoy of vehicles (for example, wheelchairs, gurneys, etc.) used in transporting individuals having a mobility deficit.

In that regard, the number of citizens requiring long-term care will more than double by the middle of this century to 27 million people. One of the most important, yet labor intensive, services of personal care is individual mobility. In intermediate care facilities (ICFs), nursing homes, and other long-term care environments, residents who have severe mobility deficits are dependant on care givers for mobility (for example, by being pushed while seated in a manual wheelchair by a caregiver). Moving a group of residents between locations is labor intensive, and requires at least three caregivers: one to stay with residents at the starting location, a second to stay with residents at the goal location, and a third to move one person at a time from the start location to the goal location.

This practice is inefficient and encourages staff to hurry to complete the process, thereby setting the stage for unsafe practices. The dangers associated with rushing are many and include a risk of injury to the patient and to the care giver (for example, back injuries resulting from rushed movements and poor ergonomics). Often, a care giver will try to push one patient with one hand while pulling another patient with the other hand. This practice presents a hazardous condition for the patients and also frequently results in strain injuries to the care giver. The time inefficiencies of current methods also create problems. For example, the time involved in assembling multiple residents with disabilities often deters their participation in group activities. Often group activities are avoided or shortened because of the amount of time required for patient movement. Current practices also create long wait times for the patients while being moved.

Removing the need for the one-to-one method for meeting mobility needs would free staff to meet other personal needs. If the residents could travel in a group mode when appropriate, such that only one staff person would be needed to accomplish the travel, many less trips would be required to accomplish the same travel schedule.

One option for group travel is a cart, van, or bus that transports non-ambulatory groups of people around a facility. However, this solution has several drawbacks. For example, each person in a wheelchair must either use a safety tie-down system or be transferred from their wheelchair to a secure seat. The time required to load and off-load such a vehicle can be significant when working with multiple wheelchair users. Infrastructure must also exist to support access into and near the home pickup points and sufficient tram staff to operate, load, unload and maintain such a system.

A number of "smart wheelchairs" that include sensors and control systems to follow moving targets, to follow tracks on a floor and to navigate various routes have been developed. However, little progress has been made in developing efficient systems for convoying wheelchairs (and/or other vehicles) that can, for example, be operated by a single operator.

Although a number of improvements have been made in wheelchair control and control of other powered vehicles, it remains desirable to develop devices, systems and methods to enable the control of powered vehicles (including wheelchairs) to enable movement of the powered vehicles in a group or as a convoy.

SUMMARY OF THE INVENTION

In one aspect, the present invention provides a vehicle convoy system for use in connection with a vehicle. The vehicle includes at least one drive mechanism to impart drive to the vehicle. The vehicle can, for example, be a self-propelled wheelchair. The vehicle convoy system includes at least a first processor that is adapted to be placed in operative or communicative connection with the drive mechanism to effect control of the drive mechanism based upon data of the position of (for example, the relative position of) a leading vehicle in front of the vehicle so that the vehicle moves to follow movement of the leading vehicle.

In several embodiments, the powered vehicle includes a controller in operative or communicative connection with the drive mechanism to control the drive mechanism. In such an embodiment, the processor of the vehicle convoying system can be placed in operative or communicative connection with the controller to transmit a signal to the controller based upon data of the position (for example, relative and/or absolute position) of the lead vehicle. The signal from the convoying system to the controller can, for example, emulate a signal from a manual control system (for example, a joystick, steering wheel or other control system as known in the vehicle arts) of the vehicle.

The vehicle convoying system can further include at least a first sensor to track movement of the leading vehicle. The vehicle convoying system can further include a tether to connect the vehicle to the leading vehicle. The tether can, for example, be extendible and the first sensor can be adapted to sense the distance to which the tether is extended. The vehicle convoying system can further include a second sensor that is adapted to sense an orientation of the tether in the vicinity of the vehicle.

In several embodiments, the tether includes at least two extending members that are connected in a telescoping manner. In several other embodiments, the tether includes a length of flexible material. The vehicle convoying system can further include a drum or other component around which the flexible material is retractably wound.

The first sensor can include a first rotary encoder operatively connected to the drum.

The second sensor can also include a second rotary encoder (to, for example, measure orientation of the tether).

The vehicle convoying system can further include at least a third sensor to measure orientation of the tether in the vicinity of the leading vehicle.

The first processor can be in communicative connection with the first sensor, the second sensor and the controller to receive data from at least one of the first sensor and the second sensor and to execute at least one algorithm to generate the signal. Likewise, the first processor can be in communicative connection with the first sensor, the second sensor, the third sensor (and one or more other sensors) and the controller to receive data from at least one of the first sensor, the second sensor and the third sensor and to execute at least one algorithm to generate the signal.

The vehicle convoying system can further include a connection sensor to sense when the tether is connected to the leading vehicle. In several embodiments, the tether comprises a coupling and the connection sensor senses when the coupling is removably connected to the lead vehicle. The coupling can, for example, be a magnetic coupling.

In several embodiments, the vehicle convoying system further includes a first module including a connector to connect the first module to the vehicle. The first module further includes a drum around which the flexible material is retractably windable, the first sensor, the second sensor and the first processor.

The vehicle convoying system can further include a second module including a connector to connect the second module to the leading vehicle. The second module can also include the third sensor.

The first module can further include a first communication system in operative connection with the first processor, and the second module can include a second communication system to communicate with the first communication system in a wireless manner.

The second module can include a second processor in communicative connection with the third sensor and with the second communication system.

The second module can also include a connection sensor in communicative connection with the second processor to sense when the tether is connected to the leading vehicle. As described above, the extending end of the tether can include a magnetic coupling.

The signal from the convoying system to the controller can, for example, be adapted to enable to the controller to control the drive mechanism to drive the vehicle to maintain substantially the same speed as the leading vehicle and substantially the same trajectory as the leading vehicle.

In another aspect, the present invention provides a vehicle including at least one drive mechanism to impart drive to the vehicle; at least one controller in communicative connection with the drive mechanism to control the drive mechanism; and at least one convoying system in communicative connection with the controller. As described above, the convoying system can be adapted to transmit a signal to the controller so that the vehicle moves to follow movement of the leading vehicle.

In several embodiments the vehicle is a wheelchair.

The convoying system can include at least a first sensor to track movement of the leading vehicle.

The convoying system can further include a tether to connect the vehicle (for example, a wheelchair) to the leading vehicle. As describe above, the tether can be extendible, and the first sensor can be adapted to sense the distance to which the tether is extended.

The convoying system can further include a second sensor that is adapted to sense an orientation of the tether in the vicinity of the vehicle.

The tether can, for example, include at least two extending members that are connected in a telescoping manner. The tether can also or alternatively include a length of flexible material. The convoying system can further include a drum or other component around which the flexible material is retractably wound.

The first sensor can include a first rotary encoder operatively connected to the drum. The second sensor can also include a second rotary encoder.

The convoying system can further include at least a third sensor to measure orientation of the tether in the vicinity of the leading vehicle.

The convoying system can further include at least a first processor in communicative connection with the first sensor, the second sensor (and/or one or more other sensors) and the controller to receive data from at least one of the first sensor and the second sensor (and/or one or more other sensors) and to execute at least one algorithm to generate the signal. The first processor can likewise be in communicative connection with the first sensor, the second sensor, the third sensor (as described above) and the controller to receive data from at least one of the first sensor, the second sensor and the third sensor and to execute at least one algorithm to generate the signal.

The convoying system can also be adapted to sense when the tether is connected to the leading vehicle. The tether can, for example, include a coupling and the, convoying system can include a connection sensor to sense when the coupling is connected to the lead vehicle. The coupling can, for example, be a magnetic coupling.

As described above, the signal from the convoying system can emulate a signal from a manual control system of the vehicle (for example, a wheelchair joystick as known in the wheelchair arts).

In several embodiments, the convoying system includes a first module which includes a connector to connect the first module to the vehicle. The first module can further include a drum around which the flexible material is retractably windable, the first sensor, the second sensor and the first processor. The convoying system of the vehicle can further include a second module including a connector to connect the second module to the leading vehicle. The second module can include the third sensor.

The first module can, for example, include a first communication system in operative connection with the first processor. The second module can, for example, include a second communication system to communicate with the first communication system in a wireless manner.

The second module can include a second processor in communicative connection with the third sensor and with the second communication system.

The second module can include a connection sensor in communicative connection with the second processor to sense when the tether is removably connected to the leading vehicle. As described above, the extending end of the tether can include a magnetic coupling.

As also described above, the signal from the convoying system to the controller can be adapted to enable the controller to control the drive mechanism to drive the vehicle to maintain substantially the same speed as the leading vehicle and substantially the same trajectory as the leading vehicle.

In another aspect, the present invention provides a vehicle convoy including at least one leading vehicle and at least one trailing vehicle positioned behind the leading vehicle. The trailing vehicle includes, for example, at least one drive mechanism to impart drive to the wheelchair; at least one controller in communicative connection with the drive mechanism to control the drive mechanism; and at least one convoying system in communicative connection with the controller as described above. The convoying system is adapted to transmit a signal to the controller so that the trailing vehicle moves to follow movement of the leading vehicle. In several embodiments, at least one of the leading vehicle and the trailing vehicle is a wheelchair.

In still a further aspect, the present invention provides a method of connecting at least one trailing vehicle and at least one leading vehicle in a convoy including: positioning the trailing vehicle behind the leading vehicle, the trailing vehicle including at least one drive mechanism to impart drive to the trailing vehicle; at least one controller in communicative connection with the drive mechanism to control the drive mechanism; and at least one convoying system in communicative connection with the controller, and causing the convoying system to transmit a signal to the controller so that the trailing vehicle moves to follow movement of the leading vehicle. In several embodiments, at least one of the leading vehicle and the trailing vehicle is a wheelchair.

As described above, the convoying system can include at least a first sensor to track movement of the leading The method can further include connecting a tether between the trailing vehicle to the leading vehicle. The tether can be extendible, and the first sensor can be adapted to sense the distance to which the tether is extended.

The convoying system can further include a second sensor that is adapted to sense an orientation of the tether in the vicinity of the trailing vehicle.

The vehicle (for example, wheelchair etc.) convoying devices, systems and methods of the present invention reduce or eliminate many problems associated with moving a plurality of vehicles. The devices, systems and methods of the present invention are, for example, well suited for moving a plurality of wheelchair-bound individuals. The present invention provides for quickly assembly and disassembly of vehicles such as patient wheelchairs into convoys with little operator training, thereby allowing a single operator to move multiple vehicles at once. In several embodiments, linking vehicles into a convoy takes just a few seconds per vehicle and doesn't require the operator to carry any tools or special equipment.

In the case of wheelchairs and other vehicles used in connection with persons of limited mobility, the vehicle convoying devices, systems and methods of the present invention reduce the time that patients spend waiting for a care giver to move them between locations; reduce staff time and physical effort required for transportation; and thereby increase social and therapeutic opportunities for clients while accommodating staffing limitations. Furthermore, movement efficiency gains provided by the present invention also provide a safe and efficient mechanism for evacuating persons of limited mobility from a facility in the event of an emergency.

The vehicle convoying devices, systems and methods of the present invention are, for example, useful with both manual wheelchairs and powered wheelchairs, without interfering with the normal operation of such wheelchairs (when the wheelchair convoying systems and methods of the present invention are not in use). The vehicle convoying devices, systems and methods of the present invention are also useful in a variety settings in which wheelchairs are used, including, for example, long-term care facilities with large populations of residents who are not independently mobile and within schools serving large numbers of children with disabilities. In schools, the devices, systems and methods of the present invention can, for example, be used at the beginning of and the end of the school day to facilitate bus loading and unloading.

Furthermore, the vehicle convoying systems and methods of the present invention system can be relatively simple and inexpensive to manufacture and implement. Existing, commercially available vehicles are readily retrofitted with the devices and systems of the present invention to enable convoying of such vehicles.

The present invention, along with the attributes and attendant advantages thereof, will best be appreciated and understood in view of the following detailed description taken in conjunction with the accompanying drawings.

DETAILED DESCRIPTION OF THE INVENTION

The present invention provides devices, systems and methods that, for example, allow at least one powered vehicle (that is, a mobile unit including at least one powered drive mechanism such as a motor or engine) to move together in a group or convoy. As used herein, the word "vehicle" refers to any mobile unit or device. In several embodiments, at least one physical or virtual "linkage" can be established between adjacent vehicles. In general, each trailing vehicle of the convoy includes at least one convoying system of the present invention in operative or communicative connection with the drive mechanism of the powered vehicle. The powered vehicle can, for example, include a control system or controller in operative and/or communicative connection with the drive mechanism thereof to control the drive mechanism. In such embodiments, the convoying system of the present invention can be in communicative connection with the drive mechanism of the powered vehicle via the controller of the powered vehicle. Many types of powered vehicles can be convoyed using the convoying devices, systems and methods of the present invention. For example, powered vehicles used in the medical arts in connection with persons with mobility deficits such as wheelchair, gurneys etc. are suitable for use with the present invention. The devices, systems and methods of the present invention are also suitable for use in connection with mobile robotic vehicles or mobile robots. Likewise, the devices, systems and methods of the present invention are suitable for use in connection with passenger vehicles such as cars, truck, golf carts, boats etc. Further, more than one type of vehicle can be convoyed using the present invention. For example, a single convoy in a hospital setting can include wheelchairs, gurneys and/or other vehicles. The order in which vehicles are assembled into convoys is unimportant. Moreover, such vehicles can be assembled into convoys, removed from convoys and rearranged within a convoy easily and quickly.

The present invention is discussed herein primarily in connection with the representative embodiment of wheelchairs including a drive mechanism, and representative systems are referred to herein as "wheelchair convoying systems". As clear to one skilled in the art, the embodiments of the present invention discussed herein in connection with wheelchairs can be used in connection with a wide variety of powered vehicles, without modification or with only minor modification (for example, in control interface parameters).

Figure 1A:
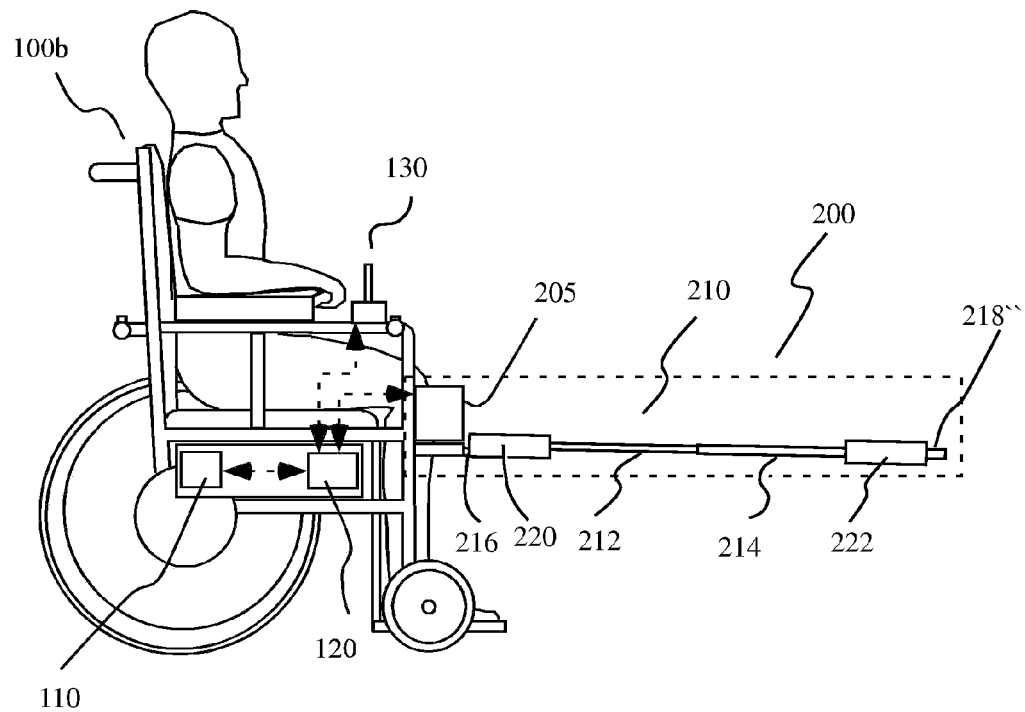
FIG. 1A illustrates an embodiment of a manual wheelchair incorporating an embodiment of a wheelchair convoying system of the present invention including a rigid physical tether.

In several embodiments of the present invention as used in connection with self-propelled or powered wheelchairs, the devices, systems and methods of the present invention enable, for example, a single staff member of a care facility to lead a "convoy" of at least two self-propelled or powered wheelchairs. In a number of embodiments, wheelchair convoying systems of the present invention can, for example, be implemented to create wheelchair convoys that include a plurality of wheelchairs 100a through 100n (see, for example, FIGS. 1B and 3) in any order thereof. Wheelchairs 100a through 100n include a drive mechanism 110 (for example, including at least one motor to drive rear wheels of the wheelchair) and at lest one controller or processor 120 (for example, including one or more microprocessors) to control drive mechanism 110. At least one physical or virtual "linkage" can be established between adjacent wheelchairs. In general, each trailing wheelchair of wheelchair convoy 10 includes at least one convoying system 200 in communicative connection with controller 120. Controller 120 can alternatively be a component of convoying system 200. Convoying system 200 is operable to transmit a signal to the controller so that the trailing wheelchair moves to follow movement of the adjacent leading wheelchair. Convoying system 200 can, for example, include at least one sensor that is operable to sense movement and/or relative position of the adjacent leading wheelchair and a processor 205 to transmit a signal to controller 120 (see FIG. 1A) of the wheelchair so that the wheelchair moves to follow the leading wheelchair.

Figure 1B:
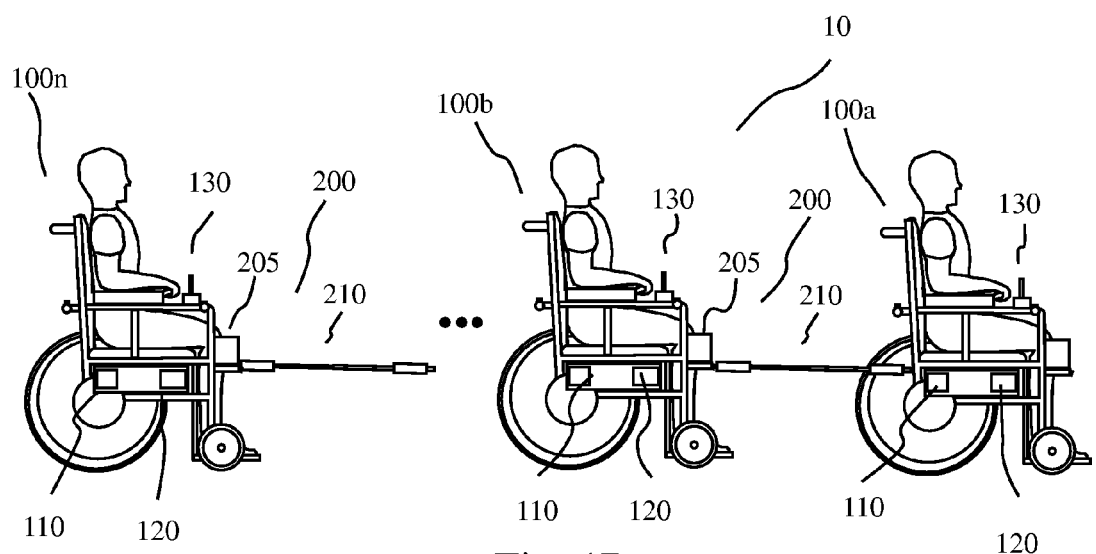
FIG. 1B illustrates a wheelchair convoy including wheelchairs as illustrated in FIG. 1A.

In several embodiments, a physical connection or link is formed between adjacent wheelchairs 100a and 100b as illustrated, for example, in FIG. 1B. The physical link is not used to transmit force or drive between adjacent wheelchairs, but to enable control of the trailing wheelchair in a manner to generally match the speed and trajectory/direction of the leading wheelchair. Wheelchairs 100a and 100b and other wheelchairs within wheelchair convoys 10 of the present invention can be manual wheelchairs to which drive mechanism 110 and controller 120 are added or can be powered wheelchairs which are manufactured to include drive mechanism 110 and controller 120. In several studies, a manual wheelchair was used. Manual wheelchairs are likely the most often used in connection with individuals requiring substantial assistance for mobility. In a number of studies, YAMAHA® JW-I (available from Yamaha Motor Company, Ltd.) powered hubs were used as drive mechanism 110 and controller 120. As known in the wheelchair arts, Yamaha JW-I power units can be mounted on a manual wheelchair frame and driven with, for example, a joystick 130, without the need for any propulsive force from the wheelchair passenger.

Figure 1C:
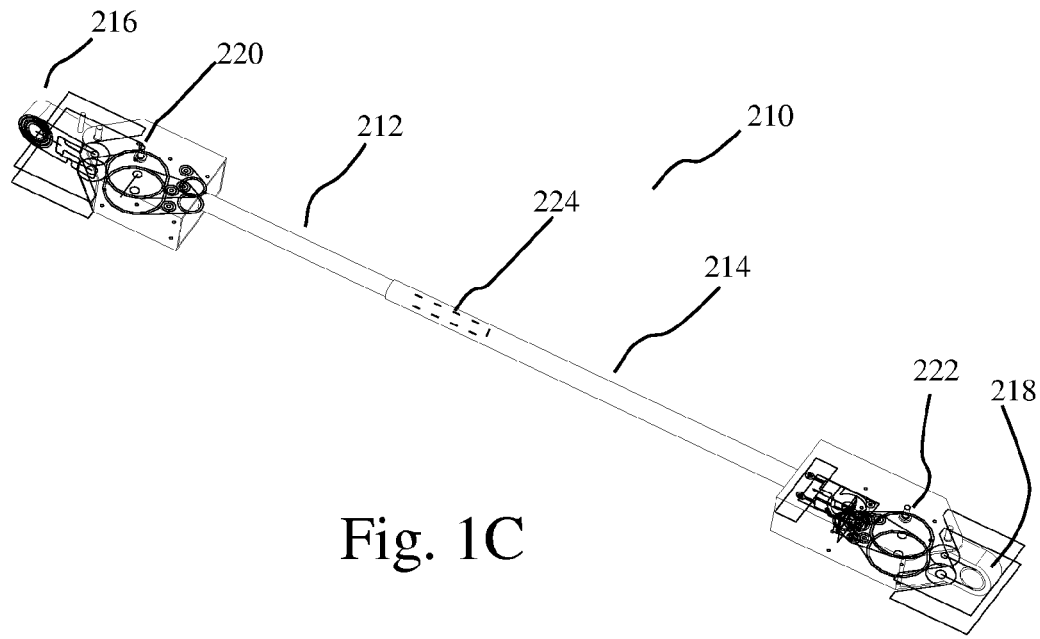
FIG. 1C illustrates an enlarged illustration of the wheelchair convoying system of FIG. 1A.
Figure 1D:
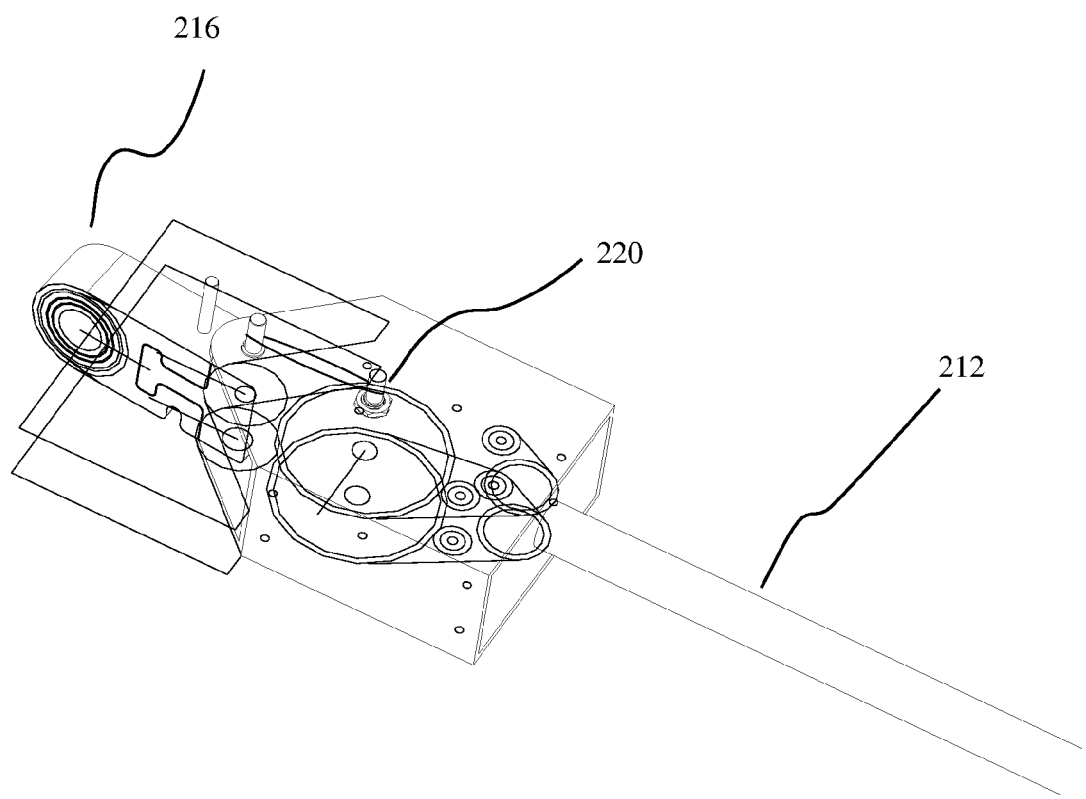
FIG. 1D illustrates an enlarged illustration of one end of the wheelchair convoying system of FIG. 1A.

In the studied embodiments, follower wheelchairs represented, for example, by wheelchair 100b in FIG. 1B were equipped with a convoying system 200, which included a VERSALOGIC™ computer or processor 205 (available from VersaLogic Corporation of Eugene, Oreg.) with built-in analog-to-digital (A/D) and digital-to-analog (D/A) circuit boards. Convoying system 200 further included a generally rigid physical or mechanical linkage 210 connected lead wheelchair 100a to trailing or following wheelchair 100b. Computer 205 used the MICROSOFT WINDOWS XP® operating system (available from Microsoft Corporation of Redmond, Wash.) and the control software was written in Microsoft Visual C++ 6.0. Mechanical linkage 210 (shown enlarged in FIGS. 1C and 1D) was fabricated from aluminum and included a telescoping shafts or rods 212 and 214 with connectors 216 and 218 (for example, clamps on the ends thereof). Each of connectors 216 and 218 was rotatably connected to shafts 212 and 214, respectively. Angle sensor 220 and 222 (for example, rotary encoders) were provided to measure the angle of or orientation of shafts 212 and 214, respectively, to connectors 216 and 218 (and to wheelchairs 100b and 100a). A sensor such as a linear encoder 224 (see FIG. 1C) was placed in operative connection with telescoping shafts 212 and 214 to measure the extension of mechanical linkage 210 and thus the distance between wheelchairs 100b and 100a. Sensors 220, 222 and 224 were in communicative connection (either wired or wireless connection) with computer 205, allowing trailing wheelchair 100b to track the distance and orientation of lead wheelchair 100a. The connection between a manual control such as a joystick 130 and motor controller 120 for the Yamaha JW-I hubs was interrupted and fed through computer 205, allowing new motor command signals to be transmitted to motor controller 120 based on the position of leading wheelchair 100a. In that regard, data including the distance between and relative orientations of adjacent wheelchairs 100a and 100b can be used in generating such command signals.

Once again, linkage or tether 210 was not used to mechanically pull the following wheelchair. Instead, linkage 210 is used for sensing relative position and movement, for example via sensing of angles and distance as described above.

Figure 2A:
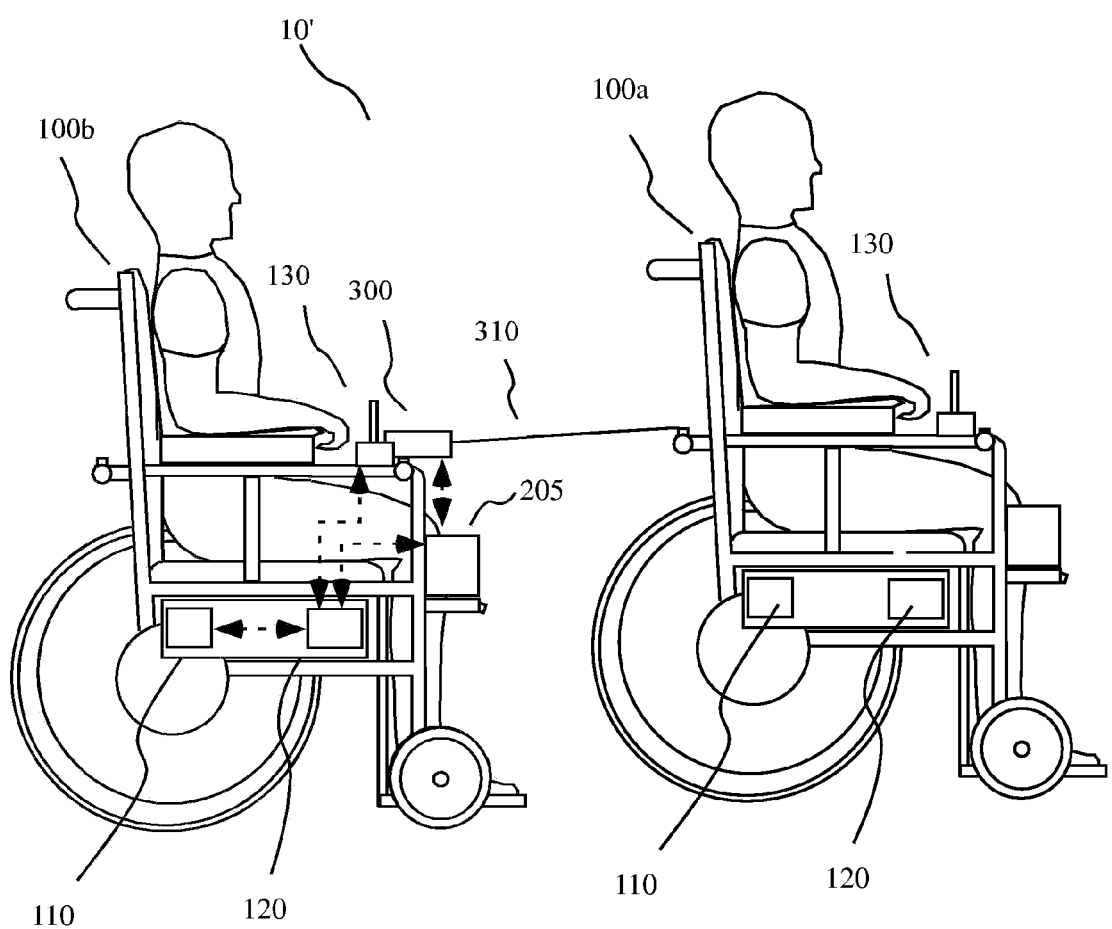
FIG. 2A illustrates a convoy of two wheelchairs incorporating an embodiment of a wheelchair convoying system of the present invention including a flexible physical tether.
Figure 2B:
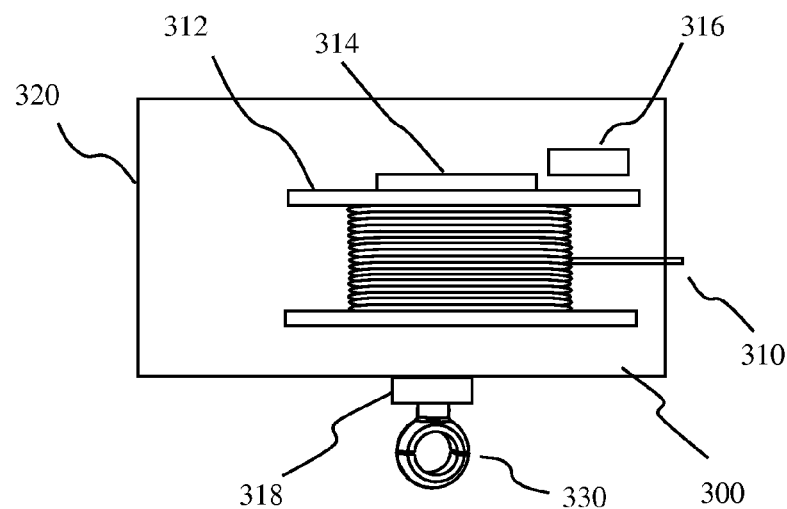
FIG. 2B illustrates an embodiment of a follower convoying system or module of the system of FIG. 2A.

In several other embodiments of the present invention (as illustrated, for example, in FIGS. 2A through 3D) the physical linkage between adjacent wheelchairs included a flexible tether, rope or string. In the embodiment of FIGS. 2A and 2B, adjacent wheelchairs 100a and 100b within wheelchair convoy 10' were tethered by a retractable rope tether 310. For example, a flexible linkage such as rope tether 310 can be retractably wound upon a spool or drum 312 within housing 320 of a follower system or module 300 (see, for example, FIG. 2B) which is attached to trailing wheelchair 100b. Spool 312 can be biased via a biasing element 314 (for example, a spring) to exert a retracting force on tether 310 as known in the spooling arts. To connect adjacent wheelchairs in convoy system 10, two wheelchairs such as wheelchair 100a and 100b are manually aligned so that one (wheelchair 100a in FIG. 2A) is in front of the other (wheelchair 100b in FIG. 2B), without touching. Retractable tether 210 is extended from follower module 300 of following or trailing wheelchair 100b toward leading wheelchair 100a and connected thereto.

In several studies of the embodiment of FIGS. 2A and 2B, manual wheelchairs equipped with YAMAHA® JW-I powered hubs were used as described above. As also described above, a VERSALOGIC computer 205 was used in connection with sensors to enable trailing wheelchair 100b to follow the motion of leading wheelchair 100a. The distance between wheelchairs 100b and 100a was, for example, determined based on the number of rotations of spool 312 using a sensor 316 (see FIG. 2B) such as a rotational encoder. The angle between leading wheelchair 100a and trailing wheelchair 100b was, for example, sensed with a second sensor 318 (for example, a rotational encoder), which can, for example, be placed in operative connection between a connector 330 (for connecting module 300 to wheelchair 100b or another wheelchair) and a housing 320 for module 300. Housing, 320 is rotatably attached to connector 330. Unlike the embodiment described in connection with FIGS. 1A through 1D, no sensor was attached to leading wheelchair 100a and an orientation measurement made at leading wheelchair 100a was not used to control motion of trailing wheelchair 100b. As clear to one skilled in the art, a module such as module 300 can be attached to leading wheelchair 100a and data can be transmitted processor 205 (for example, wirelessly) without any sensors being attached to trailing wheelchair 100b.

As described above in connection with the embodiment of FIGS. 1A through 1D, the connection between joystick 130 and motor controller 120 for the Yamaha JW-I powered hubs was interrupted and fed through computer 205, allowing new motor command signals to be transmitted to motor controller 120 from computer 205. The motor command signals were determined based on the measured distance between wheelchairs 100b and 100a and the measured angle of tether 310 connecting them as transmitted to an input port of processor 205. In general, the distance between wheelchairs 100b and 100a determined the speed of trailing wheelchair 100b, and the angle of tether 310 determined a magnitude of any required turn.

Figure 3:
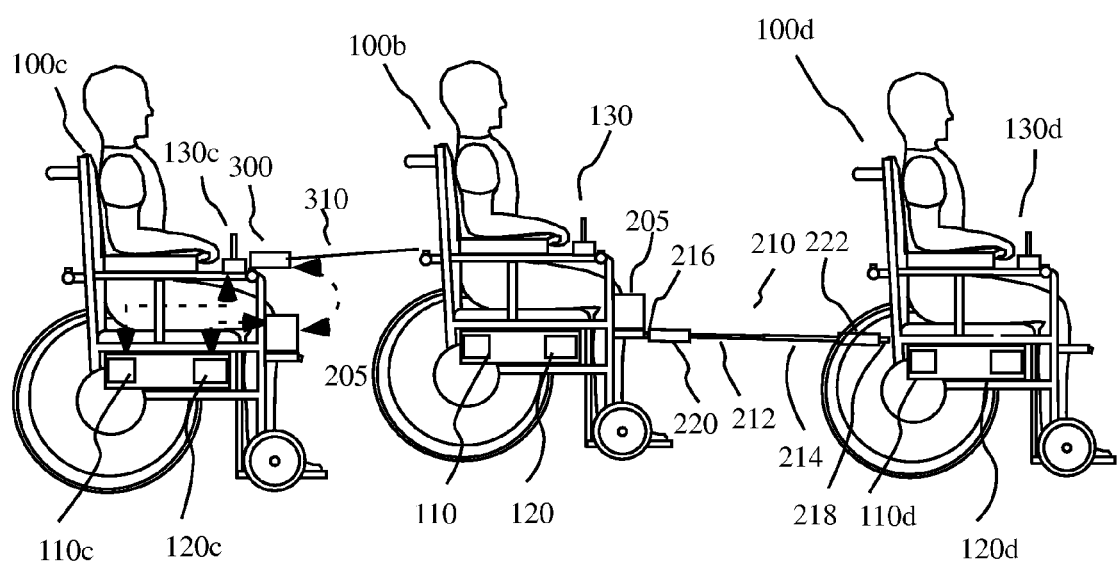
FIG. 3 illustrates an embodiment of a wheelchair convoy of the present invention including a wheelchair convoying system as illustrated in FIG. 1A and a wheelchair convoying system as illustrated in FIG. 2A.

Several unmanned trials of the embodiments of FIGS. 1A through 3 were performed. In a number of such studies, mechanical tether 210 described in connection with FIGS. 1A through 1D was mounted between a first (middle) trailing manual wheelchair 100b (see FIG. 3) equipped with Yamaha JW-I powered hubs as described above and a leading manual wheelchair. A flexible tether 310 as described in connection with FIGS. 2A and 2B was mounted between a second (end) trailing wheelchair 100c and the first trailing wheelchair 100b (see FIG. 3). Second or end trailing wheelchair 100c was a powered wheelchair (that is, a midwheel drive power wheelchair). A powered front tiller (a ROLL-AID™ powered tiller available from Stand-Aid, Inc, of Sheldon, Iowa) was attached to a lead manual wheelchair 100d. A representation of the experimental set-up is illustrated in FIG. 3. Like elements between wheelchair 100b and wheelchairs 100c and 100d are numbered similarly with the addition of the designation "c" and the designation "d", respectively.

A convoy of all three wheelchairs as illustrated in FIG. 3 was tested on a paved path. The path was 164.6 m long, 243.8 cm at its widest point and 172.7 cm at narrowest point. Two laps around the path were completed in 11 minutes and 6 seconds (5:39 for the first lap and 5:27 for the second lap). At no point did any of the tested wheelchairs stop or leave the path.

The convoy of three wheelchairs as illustrated in FIG. 3 was also tested on a slalom course that was 58.5 m long and 3.7 m wide. Each pole on the course was 20.3 cm by 20.3 cm, and 2.2 m separated the front of one pole from the back of the next pole. The convoy of three wheelchairs traversed 11 poles in one direction, turned around, traversed 16 poles in the other direction, turned around again, and traversed an additional 8 poles before the first collision occurred (a total of 35 poles and two complete turns) in 6 minutes and 48 seconds. The convoying systems of these studies were not optimized, but clearly illustrated the utility of the present invention under even difficult test conditions.

In many cases, particularly for individuals who are not able to operate a manual or powered wheelchair independently, a manual wheelchair frame is desired because it is smaller, lighter and more maneuverable. However, even individuals who are able to operate a powered wheelchair independently might occasionally benefit from the ability to join a convoy of wheelchairs. For example, the wheelchair convoy systems of the present invention are useful in evacuating an intermediate care facility in an orderly manner. The systems of the present invention can readily be incorporated with both manual wheelchairs (with powered hubs) and traditional powered wheelchairs.

Figure 4A:
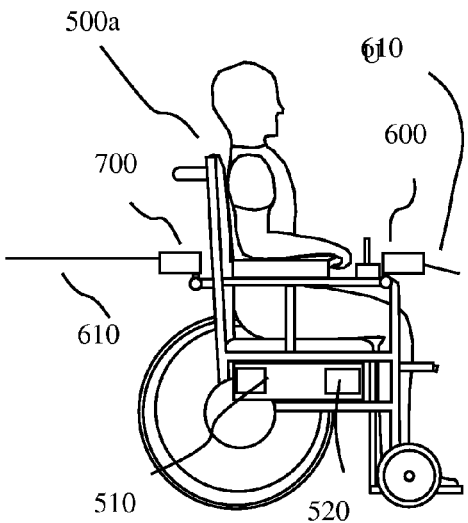
FIG. 4A illustrates a wheelchair incorporating an embodiment of a wheelchair convoying system of the present invention including a flexible physical tether, wherein the system includes a follower module and a leader module, each of which includes at least one sensor to determine an orientation of the flexible tether.
Figure 4B:
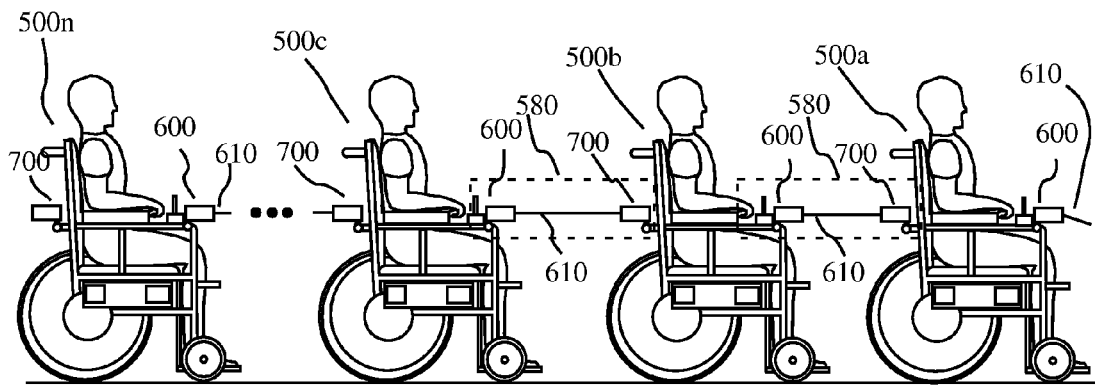
FIG. 4B illustrates a wheelchair convoy including wheelchairs as illustrated in FIG. 4A.
Figure 4C:
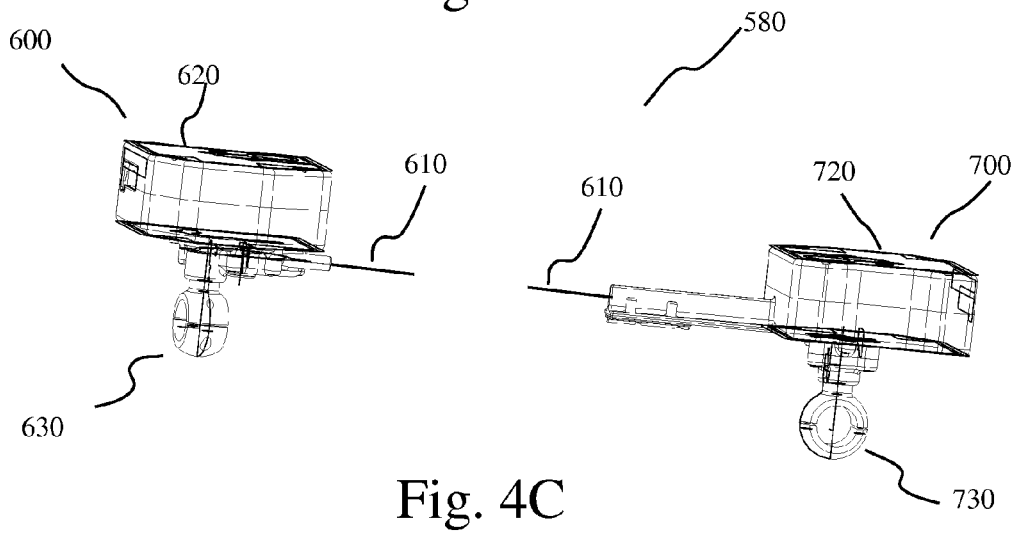
FIG. 4C illustrate a perspective view of the follower module and the leader module of the system of FIG. 4A.

FIGS. 4A through 4E illustrate another embodiment of a wheelchair 500a and convoying system 580 of the present invention for use in forming wheelchair convoys (see, for example, FIG. 4B). Similar to the embodiment of FIGS. 2A and 2B, in the embodiment of FIGS. 4A through 4E, adjacent wheelchairs are connected via a flexible tether. In the embodiment of FIGS. 4A through 4E, the trailing wheelchairs and the leading wheelchair adjacent thereto include sensing systems or modules which include sensors to, for example, determine orientation. Communication between such systems allows a trailing wheelchair to base its navigation on the data from each system. The two modules can, for example, be readily added onto or retrofitted onto, for example, a commercially available powered wheelchair or a commercially available manual wheelchair including powered hubs.

In the illustrated embodiment, convoying system 580 includes a first module 600, which is mounted in a location on the front of wheelchair 500a, and a second module 700, which is mounted in a location on the back of wheelchair 500a. First module 600 is sometimes referred to herein as follower module 600, while second module 700 is sometimes referred to herein as leader module 700. Modules 600 and 700 provide the ability for wheelchairs (and/or other vehicles) to be readily arranged into a convoy as illustrated in FIG. 4B with other similarly-equipped wheelchairs (and/or other vehicles) such as illustrated for wheelchairs 500a, 500b, 500c ... 500n.

Joining wheelchairs 500a, 500b, 500c ... 500n into a convoy is relatively quick and simple. Modules 600 and 700 enable each similarly-equipped wheelchair 500a, 500b, 500c ... 500n to be robotically controlled (as describe above) in such a way that ad hoc convoys of any order can quickly be assembled, reassembled (and/or reordered) and disassembled, for example, without tools or special equipment.

One or more sensors in, for example, each of modules 600 and 700 can monitor the relevant positions of adjacent wheelchairs. For example, variables including, but not limited to, the distance between the wheelchairs and the relative angle between the wheelchairs can be measured as described above. Using this data/information (for example, via one or more embedded microcontrollers in operative connection with controller or control system 120 or wheelchair 500*a* through 500*n* (which controls drive mechanism 110 as described above)), a trailing wheelchair is able to follow its leader using substantially the same speed and trajectory as its leader. In several embodiments, module 600 is in wireless or wired (for example, via a USB port, a serial port and/or other communication port as known in the computer arts) communication with controller 120 and is operable to control wheelchair 500*a* by emulating a standard wheelchair joystick 130.

Figure 4D:
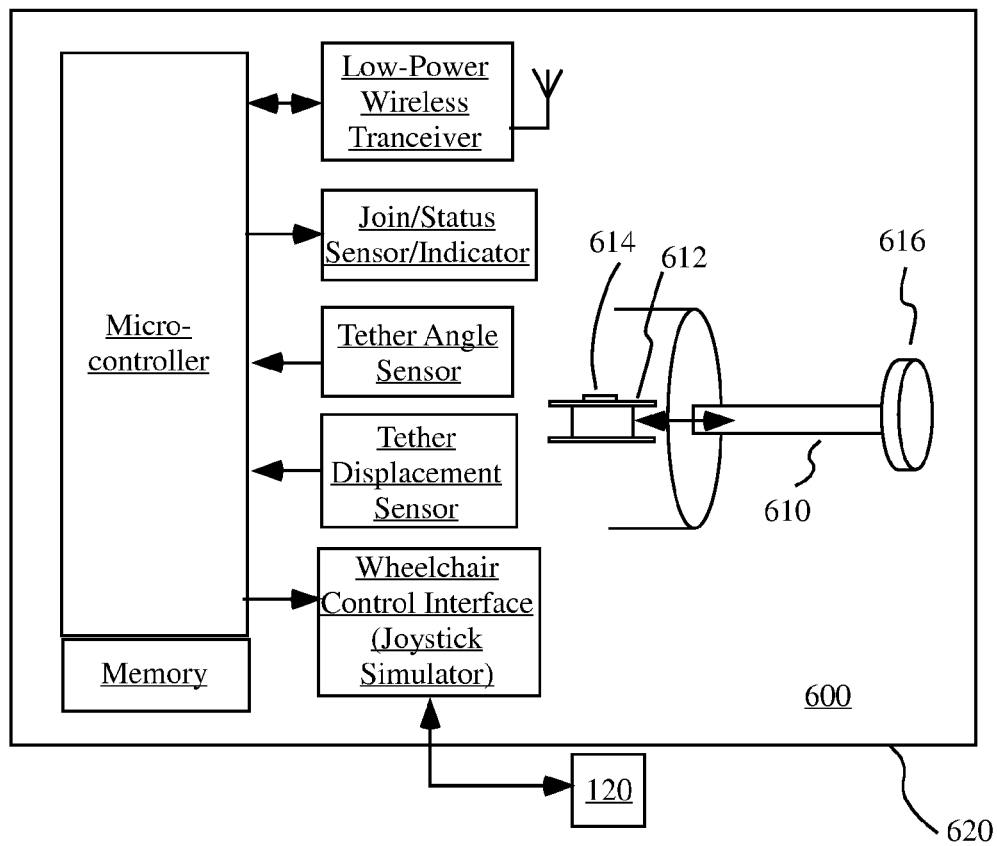
FIG. 4D illustrates a schematic representation of the follower module of the system of FIG. 4A.
Figure 4E:
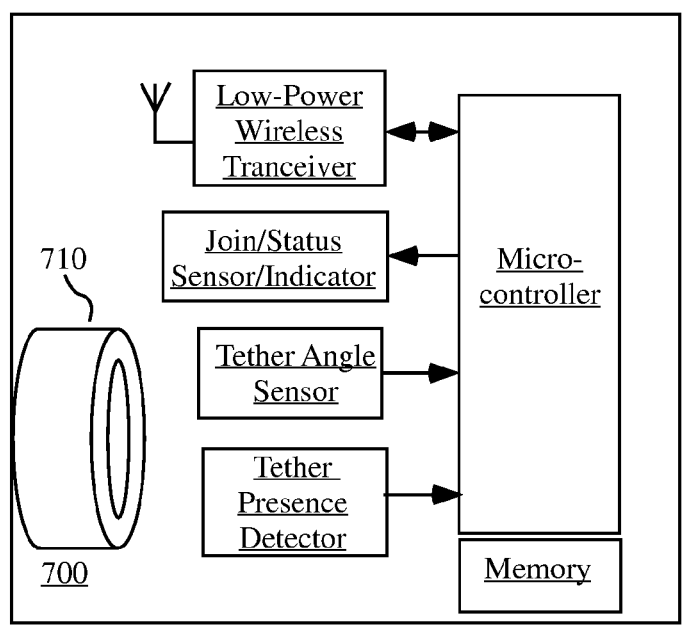
FIG. 4E illustrates a schematic representation of the leader module of the system of FIG. 4A.

As described above, a flexible linkage such as a rope tether 610 can be retractably wound upon a spool or drum 612 within housing 620 of first module 600 (see, for example, FIG. 4D). Spool 612 can be biased via a biasing element 614 (for example, a spring) to exert a retracting force on tether 610. To connect adjacent wheelchairs in a convoy, two wheelchairs such as wheelchair 500*a* and 500*b* are manually aligned so that one (wheelchair 500*a* in FIG. 4B) is in front of the other (wheelchair 500*b* in FIG. 2), without touching. Retractable tether 610 is extended from first or follower module 600, which is rotatably attached to trailing or following wheelchair 500*b* via a connector 630, toward second or leader module 700, which is rotatably attached to leading wheelchair 500*a* via a connector 730, and connected to leader module 700. In the illustrated embodiment, each of housings 620 and 720 is free to rotate relative to connectors 630 and 730, respectively, to align with the orientation of tether 610 in the vicinity of housings 620 and 720. A measurement of the orientation of housings 620 and 720 (for example, using a rotary encoder) provides a measurement of the orientation of tether 610 in the vicinity of housings 620 and 720, respectively.

In several embodiments, a forward end of tether 610 includes a magnetic coupling 616 which can, for example, be extended until it attaches to a designated connection point or cooperating coupling 710 on housing 720 of leading module 700 (see, for example, FIG. 4D). As, for example, illustrated in FIGS. 4D and 4E, wireless (for example, via a low-power wireless transceiver) or wired communication between modules 600 and 700 enables modules 600 and 700 to automatically detect that wheelchairs 500*a* and 500*b* are joined. Indicator lights on each of modules 600 and 700 of wheelchairs 500*b* and 500*a*, respectively can, for example, pulsate in unison to indicate that wheelchairs 500*b* and 500*a* are now ready to operate as part of or the whole of convoying system 580. Successful connection status can, for example, be conveyed to the care giver through a randomly selected blink pattern on one or more LED indicators on each of modules 600 and 700. In a similar manner, additional wheelchairs (such as wheelchairs 100*c* through 1000*n*) can be added to the convoy as needed.

As described above, the linking, joining or tethering process can be effected, in part, using sensors and low-power radio frequency communication. In that regard, when a care giver pulls retractable tether 610 from follower module 600, a transceiver or other communication device of module 600 can, for example, send a wireless beacon message to nearby leader modules 700. When magnet (or other) coupling 616 on tether 610 connects to cooperating coupling 710 on leader module 700, a sensor (for example, a reed switch sensor) can trigger a wireless reply message (via a transceiver or other communication device of leader module 700) to the beacon broadcast by follower module 600. Modules 600 and 700 can, for example, select a free radio channel on which to communicate and establish a known starting point of distance and position with relation to each other. Wheelchairs 500*b* and 500*a* thereby become joined in a convoy. Anywhere leading wheelchair 500*a* goes; following wheelchair 500*b* will follow (for example, maintaining the same or substantially the same speed as well as trajectory).

Tether 610 is not used to mechanically pull a wheelchair or otherwise transfer force between adjacent, tethered wheelchairs. Instead, tether 610 is used for sensing relative position and movement, for example via sensing of angles and distance as described above. In that regard, sensors such as rotary encoder in both modules monitor angles of the tether with respect to each wheelchair as well as the amount of unspooled tether. Using this information, one wheelchair is able follow its leader using the same speed and trajectory as its leader. Additionally, each following or trailing wheelchair can maintain its original join distance from its leader As described above, module 600 is operable to control the wheelchair with which it is associated by emulating standard wheelchair joystick 530.

Use of a brightly colored tether can convey to bystanders that the wheelchairs are connected. Even people unfamiliar with the convoy systems of the present invention will intuitively understand that the wheelchairs are connected and will very likely avoid walking between them.

Wheelchairs can readily be disconnected from a convoy at any time by simply disconnecting coupled tether 610 and allowing it to fully retract. Sensors in both modules can detect the removal state and the module controller can cause disengagement of any following actions. Wheelchairs can be rejoined at any time and in any order when needed.

Power used in modules 600 and 700 can, for example, be derived from the wheelchair power source (for example, one or more batteries). During system inactivity, the systems of the present invention can be placed in a sleep mode and draw very little power. In this manner, the wheelchair's battery is not be depleted much faster than the battery's own self discharge rate. Modules 600 and 700 of convoy system 580 do not require power switches, and can awake from sleep mode when sensors thereof detect that the tether has been extended and/or connected to another wheelchair.

A number of safety measures can, for example, be incorporated within the systems of the present invention. For example, unusual tether angles (for example, caused by interference from humans or obstacles); low wheelchair power; sudden complete loss of wheelchair power; unexpected tether disconnection; or other events can be monitored and can, for example, be made to trigger an emergency stop message that will immediately stop all wheelchairs in the convoy (for example, via wireless communication between wireless transceivers of modules 600 and 700).

As known in the computer arts, control software for control of the systems of the present invention can, for example, be stored in memory systems of modules 600 and 700 for execution by the processors of those modules.

Figure 5:
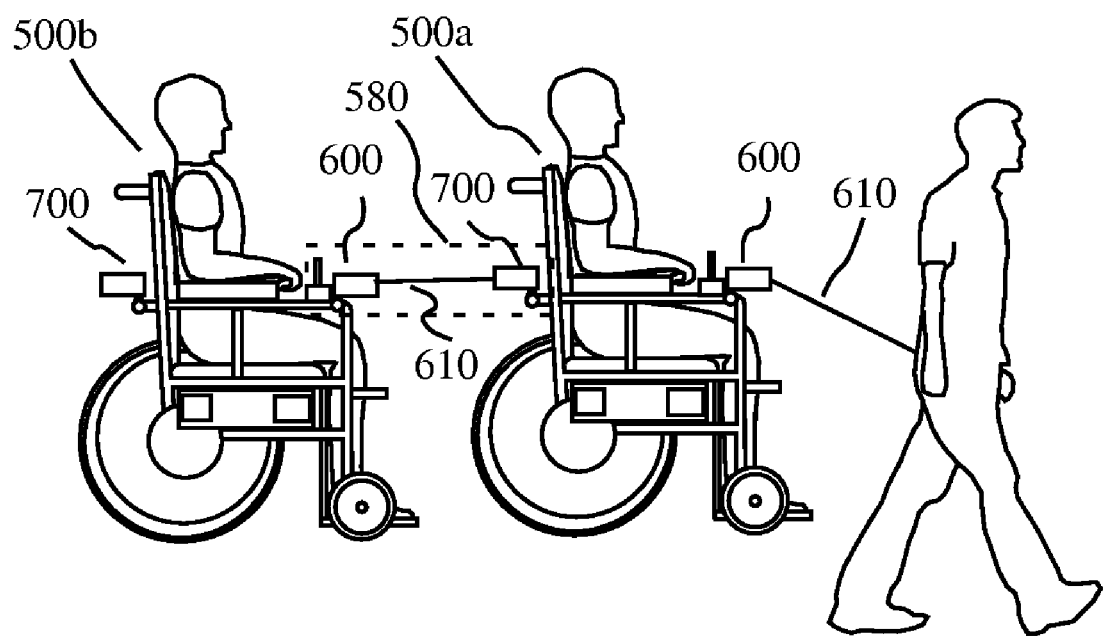
FIG. 5 illustrates a wheelchair convoy of the present invention wherein the lead wheelchair is being guided by a moving person.

As illustrated, for example, in FIG. 5, tether 610 of a follower module 600 of a leading wheelchair 500*a* can be gripped by a person to guide the convoy. A set angle of tether 610 between module 600 of leading wheelchair 500*a* and the person can be established so that, for example, the person can walk to the side of lead wheelchair 500*a* on a pathway and lead wheelchair 500a will be caused to follow on a path generally parallel to that taken by the person.

In the above-described embodiments of the present invention a physical tether was connected between adjacent vehicles such as wheelchairs. An untethered or virtual connection can also be established using, for example, energy transceivers or other energy communication devices such as electromagnetic transceivers (for example, radio frequency transceivers), optical transceivers, sonic transceivers (for example, ultrasound) etc. and combinations thereof in systems that enable measurement of, for example, distance between vehicles and relative orientation of vehicles.

Figure 6:
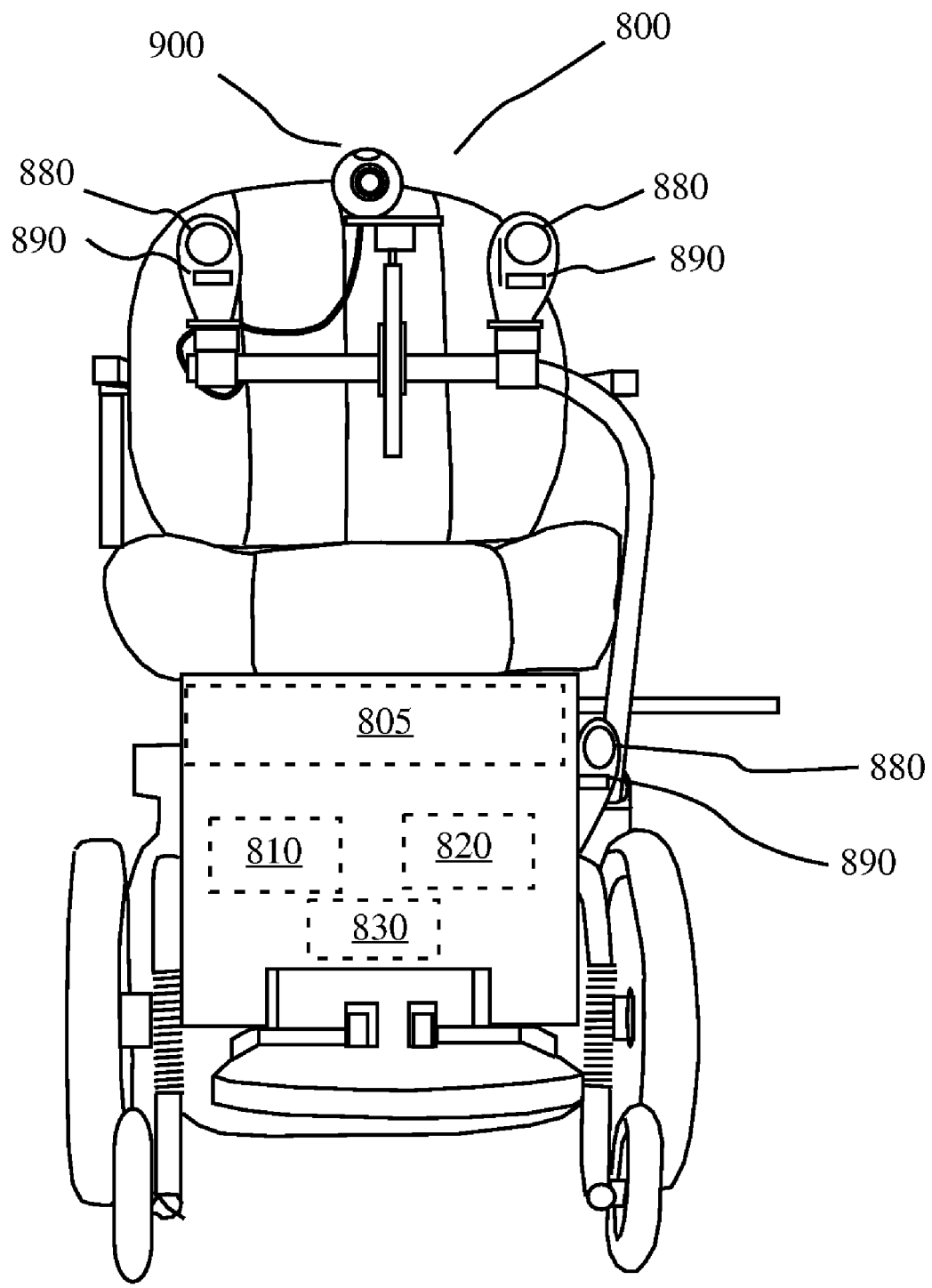
FIG. 6 illustrates an embodiment of a wheelchair including a wheelchair convoy system of the present invention including optical, sonic and infrared sensors.

In another embodiment of the present invention as illustrated in FIG. 6, a midwheel drive power wheelchair 800 was equipped with three sonar sensor 880 (SONASWITCH® MiniA sonar sensors available from Electronic Design & Packaging (EDP) of Livonia, Mich.), three infrared sensors 890 and a Logitech QUICKCAM® Pro-4000 camera 900 (available from Logitech International, SA of Fremont, Calif., which were mounted on the wheelchair lap tray. Control software was written in MICROSOFT VISUAL C++ 6.0 and implemented on a Pentium III, 933 Mhz, 528 MB RAM TOSHIBA laptop computer 805. Computer vision was implemented using the INTEL OpenCV libraries of Intel Corporation. Two PCMCIA data acquisition cards were used to interface with the sonar sensors and the wheelchair's motor controller 820 (which controls drive mechanism/motor 810). Wheelchair 800 is powered by battery 830.

Figure 7:
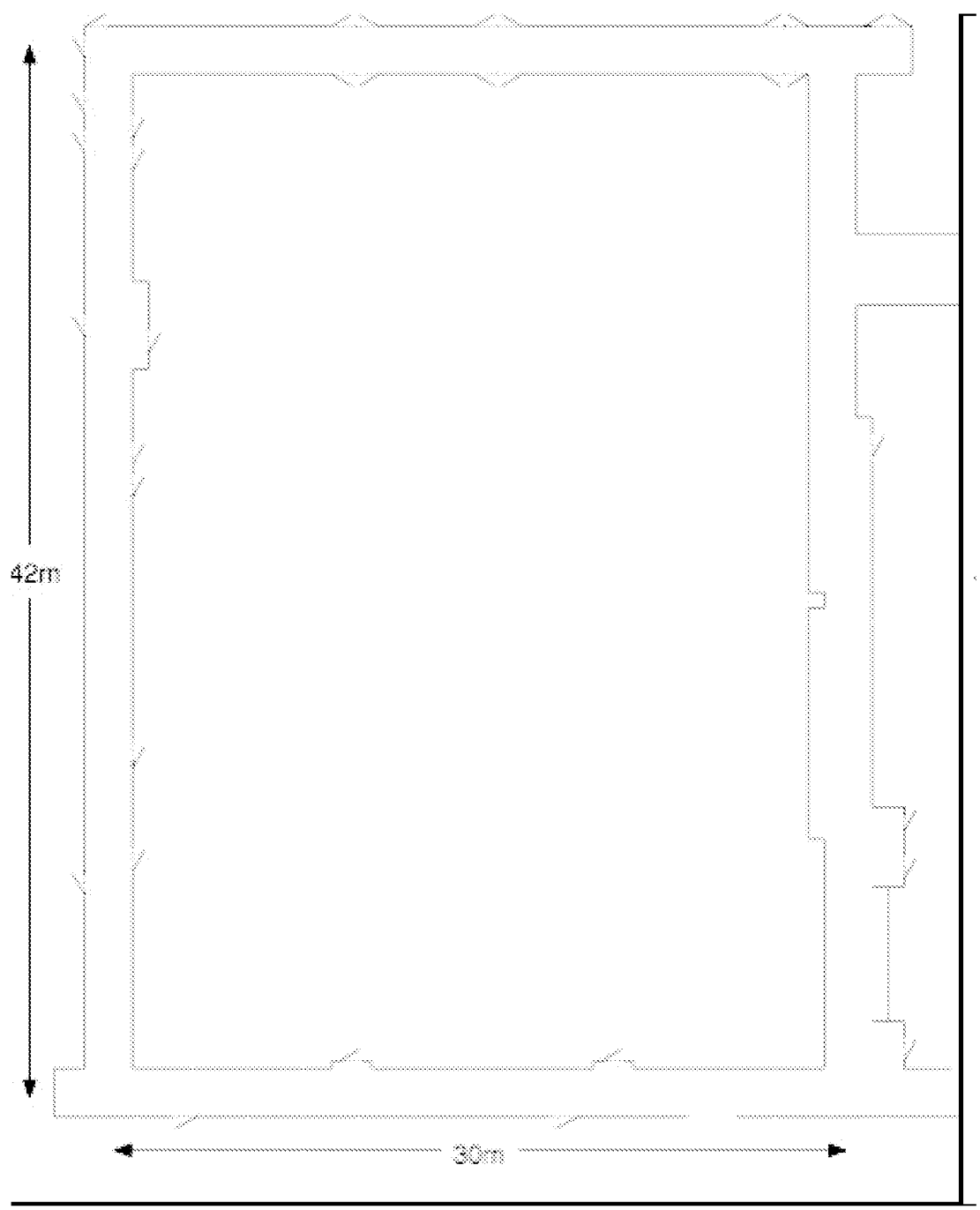
FIG. 7 illustrates a track used to test the wheelchair convoy system of FIG. 6.

The non-optimized system was evaluated in unmanned tests in an office building. Wheelchair 800 tracked a moving leading target (a person wearing a green shirt) around the course illustrated in FIG. 7. The course spanned a total distance of 142 meters (155 yards), and included numerous alcoves and outcroppings. At its narrowest point, the course was 1.4 meters (4.5 feet) wide. No additional lighting beyond the existing ambient light was provided, and at least one section of the course was particularly dark. The course was empty of moving objects, other than the leading person. The system successfully navigated the entire course at a constant speed without colliding with any obstacle. Sonar sensors 880 and infrared sensors 890 were used as a "backup" system to help ensure that wheelchair 800 did not collide with any object or person. In that regard, camera 900 provided a "virtual tether" using computer vision, while the sonar sensors 880 and/or infrared sensors 890 were used to sense the distance between the wheelchair and any object in front of the wheelchair (which could be the leading attendant or an obstacle). If sonar sensors 880 and/or infrared sensors 890 detected an object within a certain distance (designated as a collision risk) the system could stop the wheelchair. During testing, however, data from sonar sensors 880 and infrared sensors 890 were not required in controlling motion of wheelchair 800.

In addition to or in the alternative to the physical and virtual tethers discussed above, motion tracking systems such as inertial navigation systems can be used to provide data of position in the present invention. Further, data of absolute position in reference to a fixed grid can, for example, be provided using a cellular phone module via triangulation methods known in the art. Data from other location systems such as a global positioning system or GPS can likewise be used.

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A vehicle convoy system for use in connection with a powered vehicle adapted to provide mobility, the powered vehicle comprising at least one drive mechanism to impart drive to the powered vehicle and a controller in operative connection with the drive mechanism, the vehicle convoy system comprising at least a first processor adapted to be placed in communicative connection with the drive mechanism to effect control of the drive mechanism based upon data of the position of a leading vehicle in front of the powered vehicle, a tether to removably connect the powered vehicle to the leading vehicle, a length of the tether being variable when connecting the powered vehicle to the leading vehicle, and at least a first sensor associated with the tether and in communicative connection with the first processor to provide data to the first processor of the position of the leading vehicle so that the powered vehicle is adapted to move to follow movement of the leading vehicle when the powered vehicle is placed in connection with the leading vehicle via the tether, the leading vehicle being adapted to provide mobility independently from the powered vehicle when the powered vehicle is not tethered to the leading vehicle, the first processor of the powered vehicle convoying system being in communicative connection with the controller to transmit a signal to the controller based upon data of the position of the leading vehicle.

2. The vehicle convoying system of claim 1 wherein the powered vehicle is a wheelchair.

3. The vehicle convoying system of claim 1 wherein the first sensor is adapted to sense the distance to which the tether is extended.

4. The vehicle convoying system of claim 3 further comprising a second sensor, the second sensor being adapted to sense an orientation of the tether in the vicinity of the powered vehicle.

5. The vehicle convoying system of claim 4 wherein the first processor is in communicative connection with the first sensor, the second sensor and the controller to receive data from at least one of the first sensor and the second sensor and to execute at least one algorithm to generate the signal.

6. The vehicle convoying system of claim 3 wherein the tether comprises a length of flexible material.

7. The vehicle convoying system of claim 6 further comprising a drum around which the flexible material is retractably wound.

8. The vehicle convoying system of claim 7 wherein the first sensor comprises a first rotary encoder operatively connected to the drum.

9. The vehicle convoying system of claim 8 further comprising a second sensor adapted to sense an orientation of the tether in the vicinity of the powered vehicle.

10. The vehicle convoying system of claim 9 further comprising at least a third sensor to measure orientation of the tether in the vicinity of the leading vehicle.

11. The vehicle convoying system of claim 10 wherein the first processor is in communicative connection with the first sensor, the second sensor, the third sensor and the controller to receive data from at least one of the first sensor, the second sensor and the third sensor and to execute at least one algorithm to generate the signal.

12. The vehicle convoying system of claim 11 further comprising a connection sensor to sense when the tether is connected to the leading vehicle.

13. The vehicle convoying system of claim 12 wherein the tether comprises a coupling and the connection sensor senses when the coupling is connected to the leading vehicle.

14. The vehicle convoying system of claim 13 wherein the coupling is a magnetic coupling.

15. The vehicle convoying system of claim 11 wherein the signal emulates a signal from a manual control system of the powered vehicle.

16. The vehicle convoying system of claim 11 further comprising a first module comprising a connector to connect the first module to the vehicle, the first module further comprising a drum around which the flexible material is retractably windable, the first sensor, the second sensor and the first processor.

17. The vehicle convoying system of claim 16 further comprising a second module comprising a connector to connect the second module to the leading vehicle, the second module comprising the third sensor.

18. The vehicle convoying system of claim 17 wherein the first module comprises a first communication system in operative connection with the first processor and the second module comprises a second communication system to communicate with the first communication system in a wireless manner.

19. The vehicle convoying system of claim 18 wherein the second module comprises a second processor in communicative connection with the third sensor and with the second communication system.

20. The vehicle convoying system of claim 19 wherein the second module comprises a connection sensor in communicative connection with the second processor to sense when the tether is connected to the leading vehicle.

21. The vehicle convoying system of claim 20 wherein the extending end of the tether comprises a magnetic coupling.

22. The vehicle convoying system of claim 20 wherein the signal emulates a signal from a manual control system of the powered vehicle.

23. The vehicle convoying system of claim 22 wherein the manual control system is a joystick.

24. The vehicle convoying system of claim 1 wherein the signal from the convoying system to the controller is adapted to enable to the controller to control the drive mechanism to drive the powered vehicle to maintain substantially the same speed as the leading vehicle and substantially the same trajectory as the leading vehicle.

25. A vehicle for providing mobility, comprising:
at least one drive mechanism to impart drive to the vehicle;
at least one controller in communicative connection with the drive mechanism to control the drive mechanism;
at least one convoying system in communicative connection with the controller, the convoying system comprising a tether of variable length to removably connect the vehicle to a leading vehicle in front of the vehicle and at least a first sensor associated with the tether to provide data of the position of the leading vehicle, the convoying system being adapted to transmit a signal to the controller based upon the data of the position of the leading vehicle so that the vehicle is adapted to move to follow movement of the leading vehicle, the leading vehicle being adapted to provide mobility independently from the vehicle when the vehicle is not tethered to the leading vehicle.

26. The vehicle of claim 25 wherein the vehicle is a wheelchair.

27. The vehicle of claim 26 wherein the signal emulates a signal from a manual control system of the vehicle.

28. The vehicle of claim 25 wherein the tether is extendible and the first sensor is adapted to sense the distance to which the tether is extended.

29. The vehicle of claim 28 wherein the convoying system further comprises a second sensor, the second sensor being adapted to sense an orientation of the tether in the vicinity of the vehicle.

30. The vehicle of claim 29 wherein the convoying system comprises at least a first processor in communicative connection with the first sensor, the second sensor and the controller to receive data from at least one of the first sensor and the second sensor and to execute at least one algorithm to generate the signal.

31. The vehicle of claim 28 wherein the tether is a length of flexible material.

32. The vehicle of claim 31 wherein the convoying system further comprises a drum around which the flexible material is retractably wound.

33. The vehicle of claim 32 wherein the first sensor comprises a first rotary encoder operatively connected to the drum.

34. The vehicle of claim 33 wherein the second sensor comprises a second rotary encoder.

35. The vehicle of claim 31 wherein the convoying system further comprises at least a third sensor to measure orientation of the tether in the vicinity of the leading vehicle.

36. The vehicle of claim 35 wherein the convoying system comprises at least a first processor in communicative connection with the first sensor, the second sensor, the third sensor and the controller to receive data from at least one of the first sensor, the second sensor and the third sensor and to execute at least one algorithm to generate the signal.

37. The vehicle of claim 36 wherein the convoying system is adapted to sense when the tether is connected to the leading vehicle.

38. A vehicle convoy comprising:
at least one leading vehicle; and
at least one trailing vehicle positioned behind the leading vehicle, the trailing vehicle comprising at least one drive mechanism to impart drive to the trailing vehicle; at least one controller in communicative connection with the drive mechanism to control the drive mechanism; and at least one convoying system in communicative connection with the controller, the convoying system comprising a tether of variable length to removably connect the trailing vehicle to the leading vehicle and at least a first sensor associated with the tether to provide data of the position of the leading vehicle, the convoying system being adapted to transmit a signal to the controller so that the trailing vehicle is adapted to move to follow movement of the leading vehicle, the leading vehicle being adapted to provide mobility independently from the trailing vehicle when the trailing vehicle is not tethered to the leading vehicle.

39. The vehicle convoy of claim 38 wherein at least one of the leading vehicle and the trailing vehicle is a wheelchair.

40. A method of grouping at least one trailing vehicle and at least one leading vehicle in a convoy comprising:
positioning the trailing vehicle behind the leading vehicle, the trailing vehicle comprising at least one drive mechanism to impart drive to the vehicle; at least one controller in communicative connection with the drive mechanism to control the drive mechanism; and at least one convoying system in communicative connection with the controller, the convoying system comprising a tether of variable length to removably connect the trailing vehicle to the leading vehicle and at least a first sensor associated with the tether to provide data of the position of the leading vehicle, connecting the tether between the trailing vehicle and the leading vehicle;

causing the convoying system to transmit a signal to the controller so that the trailing vehicle is adapted to move to follow movement of the leading vehicle, the leading vehicle being adapted to provide mobility independently from the trailing vehicle when the trailing vehicle is not tethered to the leading vehicle.

41. The method of claim 40 wherein at least one of the leading vehicle and the trailing vehicle is a wheelchair.

* * * * *